United States Patent
Bauer et al.

(10) Patent No.: US 7,318,052 B2
(45) Date of Patent: Jan. 8, 2008

(54) KNOWLEDGE TRANSFER EVALUATION

(75) Inventors: Kurt R. Bauer, Wiesloch (DE);
Thomas Hutzschenreuter, Neuwied (DE); Angelika M. Vieth, Neckarhausen (DE); Florian Listner, Koblenz (DE)

(73) Assignee: SAP AG, Walldorf (DE)

( * ) Notice: Subject to any disclaimer, the term of this patent is extended or adjusted under 35 U.S.C. 154(b) by 247 days.

(21) Appl. No.: 11/038,830

(22) Filed: Jan. 18, 2005

(65) Prior Publication Data

US 2006/0085369 A1    Apr. 20, 2006

Related U.S. Application Data

(60) Provisional application No. 60/619,541, filed on Oct. 15, 2004.

(51) Int. Cl.
*G06F 17/00* (2006.01)

(52) U.S. Cl. .............................. 706/46; 706/45; 706/47; 705/1; 705/7; 705/8; 705/9; 705/12; 434/322; 434/348; 434/349; 434/350; 434/365

(58) Field of Classification Search .................. 706/10, 706/11, 14–21, 45–48, 60, 61; 434/81, 322, 434/323, 348, 350, 365, 362; 715/700, 701, 715/707, 733, 747, 971; 705/1, 7–9, 12
See application file for complete search history.

(56) References Cited

U.S. PATENT DOCUMENTS

| | | | | |
|---|---|---|---|---|
| 6,587,668 | B1 * | 7/2003 | Miller et al. | 434/350 |
| 2004/0002888 | A1 * | 1/2004 | Draper et al. | 705/9 |
| 2004/0009462 | A1 * | 1/2004 | McElwrath | 434/350 |
| 2004/0259068 | A1 * | 12/2004 | Philipp et al. | 434/350 |
| 2006/0234201 | A1 * | 10/2006 | Pierson et al. | 434/323 |

* cited by examiner

*Primary Examiner*—David Vincent
*Assistant Examiner*—Omar F Fernández Rivas
(74) *Attorney, Agent, or Firm*—Kenyon & Kenyon LLP

(57) ABSTRACT

A knowledge transfer approach is assessed by assigning multiple situation attributes for the knowledge transfer approach. Furthermore, a plurality of communication forms are attributed to the knowledge transfer approach. Based on the situation attributes and the communication form attributes, multiple relationships are derived. Based on these relationships, a compatibility value is determined between the situation attributes and the communication form attributes. Therefore, for a particular knowledge transfer approach, a compatibility value provides an indicator of the effectiveness of the knowledge transfer approach to a customer's specific needs. Moreover, the with multiple knowledge transfer approaches, the effectiveness of these approaches can be assessed by a calculation of compatibility values for each approach and the comparison of the different values.

19 Claims, 6 Drawing Sheets

| SIT.FORM ATTRIBUTES | COMMUNICATION FORM ATTRIBUTES | | | | | | | | | |
|---|---|---|---|---|---|---|---|---|---|---|
| | 1 | 2 | 3 | 4 | 5 | 6 | 7 | 8 | 9 | 10 |
| A | X |   | X |   | X |   |   |   |   |   |
| B | X | X | X |   | X | X | X | X |   |   |
| C | X |   |   |   | X |   | X | X |   | X |
| D | X |   |   |   | X | X | X | X |   |   |
| E | X |   |   |   | X | X | X | X |   |   |
| F | X |   | X |   | X | X | X | X |   |   |
| G |   |   | X |   |   |   |   | X | X | X |
| H | X |   | X |   | X |   |   |   |   | X |
| I | X |   |   |   | X | X | X |   |   | X |
| J |   |   | X | X | X | X |   |   |   |   |
| K | X |   | X |   | X |   |   | X | X |   |
| L |   |   | X |   |   | X |   | X | X |   |

FIG. 6

KNOWLEDGE TRANSFER EVALUATION

CROSS REFERENCE TO RELATED APPLICATIONS

This application claims priority to U.S. provisional application No. 60/619,541 filed on Oct. 15, 2004, all of which is incorporated by reference herein.

BACKGROUND

The present invention relates generally to the area of knowledge transfer and more specifically to the evaluation and determination of an appropriate knowledge transfer method.

With the advancement of technology, there exists the further advancement in training end users to maximize use of the technology. Currently, training approaches for technology consist of several different available platforms. One common training approach is a classroom environment where a large number of users are trained simultaneously on a new technology, such as a new software application. This training approach can be expensive and time consuming based on various factors, such as the number of users to be trained, the user's existing knowledge base, the location of the training, the complexity of the technology, the user's level of use of the technology. In certain situations, the classroom training approach may not be the most practical.

Another training approach includes individual self-training through interactive guides. This self-training may be more effective for individualized learning, but it is often limited to existing learning templates. Also, the interactive guide approach does not allow for user feedback or direct questions, outside of a typical frequently asked questions template.

As recognized by one skilled in the art, there are numerous approaches to training users on new technology. Current techniques for training users on new technology consist of selecting a knowledge transfer operation, e.g. training approach, without assessing the benefits and limitations of the selected approach. Most often, the knowledge transfer operation is based on previous knowledge transfer operations and existing systems. For example, if a customer has a computer training facility, the customer is likely to use the training facility for the knowledge transfer operation based on having the facilities, without assessing the effectiveness of this knowledge transfer operation.

When a customer invests in a new technology, the customer must also invest a significant amount of resources to the training of the users on this technology. The training expenses include lost employee time and related costs for the knowledge transfer operations. For example, using a central training facility may require users to travel, thereby incurring travel expenses in addition to employee time, expenses associated with paying a trainer and maintenance of the training facility. Therefore, when a customer uses a particular knowledge transfer operation, if this approach is not the most beneficial approach, the customer stands to lose not only expenses on the implementation of the knowledge transfer operation, but further expenses due to follow-up requirements if users do not fully understand the new technology. Also, the customer will incur expenses from lost productivity as users struggle to utilize the new technology on a going forward basis.

Customers seeking to implement knowledge transfer operations for new technology should seek to utilize the most effective knowledge transfer operation. There currently does not exist an approach to determining the best knowledge transfer approach for customer based on the customer's knowledge transfer requirements. As each user training approach has benefits and limitations and the different knowledge transfer operations work better for different training approaches, there exists a need for determining which knowledge transfer operation is most effective for each different knowledge transfer scenario.

BRIEF DESCRIPTION OF THE DRAWINGS

FIG. 6 illustrates an exemplary relationship matrix; and

DETAILED DESCRIPTION

Through assessing different knowledge transfer approaches, a customer may effectively determine the best possible approach for performing knowledge transfer operations. Based on a wide array of customer information, each available knowledge transfer approach can be specifically analyzed and the effectiveness of each approach compared. Using this comparison determines the most effective knowledge transfer approach.

Through using the most effective knowledge transfer approach, the customer reduces overhead costs associated with training each user on the new technology. Through the selection of the most appropriate knowledge transfer approach, the software end users are more aptly trained for improved implementation and more effective usage of the software.

Moreover, the determination of the most effective knowledge transfer approach works directly with each customer's specific needs. Therefore, a tailored approach to solving each individual customer's requirements are determined with a general approach. Customers are not required to invest resources into ineffective training techniques but may determine quickly and accurately the best knowledge transfer approach for their specific needs. Through the improved knowledge transfer of training information to users, the overall costs for a customer to implement new technologies are reduced, promoting advancements of new technologies from not only the development side, but also the customer-acceptability side.

Figure 1:
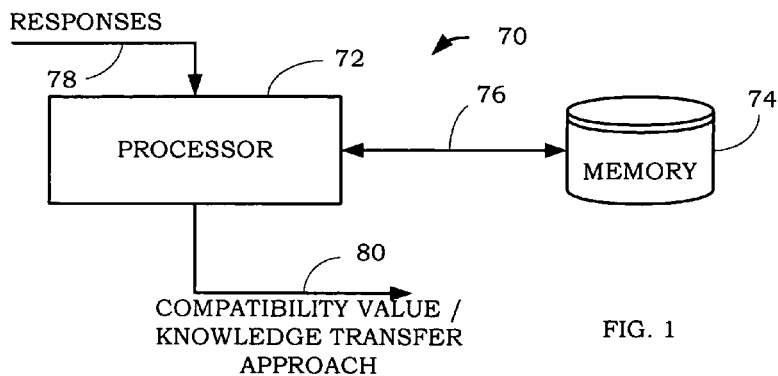
FIG. 1 illustrates a block diagram of one embodiment of an apparatus for assessing a knowledge transfer approach.

FIG. 1 illustrates an embodiment of an apparatus 70 for assessing and evaluating different knowledge transfer approaches. The apparatus 70 includes a processor 72 and a memory 74. The processor 72 is in operative communication with the memory 74 and receives executable instructions 76 therefrom. The processor 72, in response to the executable instructions 76, is operative to perform the steps discussed in further detail below, including the steps of the flowchart of FIG. 3.

The processor 72 may be, but not limited to, a single processor, a plurality of processors, a DSP, a microprocessor, an ASIC, a state machine, or any other implementation capable of processing and executing software. The term processor should not be construed to refer exclusively to hardware capable of executing software and may implicitly include DSP hardware, ROM for storing software, RAM, and any other volatile or non-volatile storage medium. The memory 74 may be any suitable memory or storage location operative to store sales information or any other suitable information therein including, but not limited to, a single memory, a plurality of memory locations, shared memory, CD, DVD, ROM, RAM, EEPROM, optical storage, microcode, or any other non-volatile storage capable of storing information.

In one embodiment, the memory 74 further stores the rules for determining the compatibility of the communication forms with the learning methods, as discussed in further detail below. The processor 74 receives responses 78 associated with a knowledge transfer operation. The responses 78 may be answers to specific questions posed to a customer, the responses may be categorical associations relating to the customer and/or the knowledge transfer techniques used by the customer or any other information regarding knowledge transfer operations by the customer. The responses include a plurality of factors, which are individual elements that may be compared to guidelines or rules assessing the compatibility of different knowledge transfer approaches. The knowledge transfer operation may be factors relating to the training of users, such as but not limited to previous training techniques, number of users, location of users and user access requirements.

Based on the response 78, the processor 72 generates a relationship matrix using predefined guidelines governing the knowledge transfer approaches, such as described in further detail below. A compatibility value 80 is determined based on the matrix. The processor 72 is then operative to generate an output value including the compatibility value 80. In another embodiment, as discussed further below, the processor 72 may also generate a knowledge transfer approach recommendation based on generating relationship matrices and compatibility values for multiple learning methods using different communication forms. As such, the apparatus 70 generates the output 80 by comparing the guidelines 78 to various sets of rules and the derivation of relationships between the attributes for the learning methods and the communication forms. The output 80 may be an indicator of the appropriate knowledge transfer technique for the particular customer's situation. In another embodiment, the output 80 may be a compatibility value representing how compatible a particular knowledge transfer technique is with respect to the customer's situation.

Figure 2:
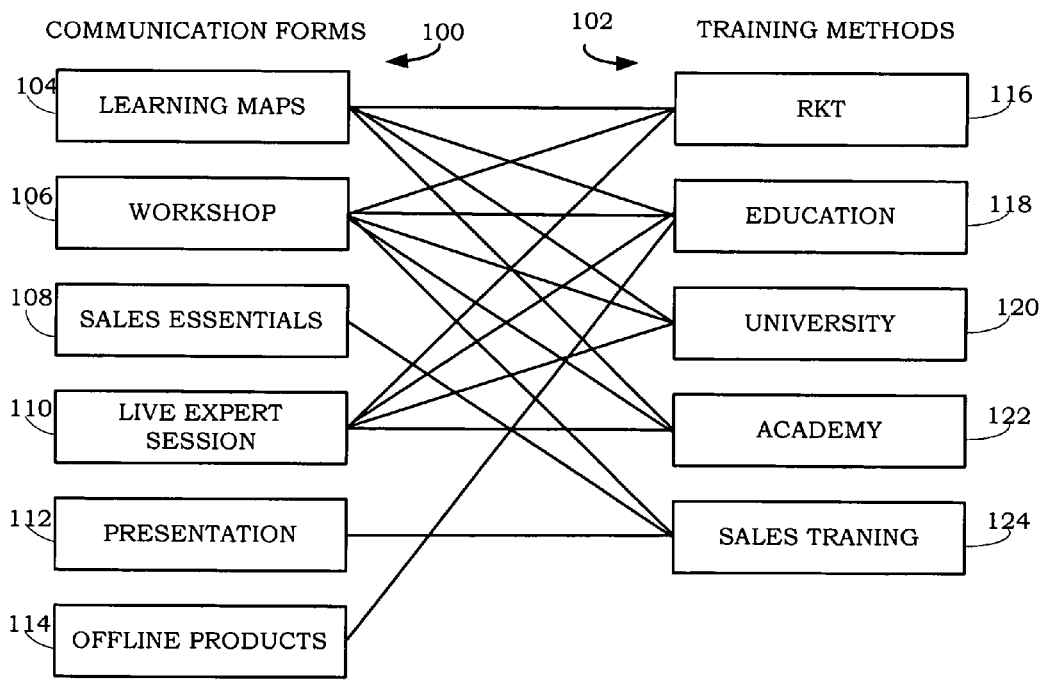
FIG. 2 illustrates a block diagram of one embodiment of relationships between communication forms and learning forms.

FIG. 2 illustrates a block diagram of various communication forms 100 and training methods 102. Each training method 102 may be implemented using some of the different communication forms 100. FIG. 2 also illustrates several relationships between the communication forms 100 and the training methods 102.

The communication forms 100 include learning maps 104, workshops 106, sales essentials 108, live expert sessions 110, presentations 112 and offline products 114. The learning maps 104 may be pre-generated active tutorials running in parallel with a user's operations of the software application, such as a pop-up window providing step-by-step training directions. The workshop 106 may be an active participation program providing users general instructions during a live presentation. The sales essential 108 is a direct training approach to sales professionals illustrating the software application for the purpose of procuring customers by the sales persons demonstrating the software. Live expert sessions 110 may be similar to the workshop except a specific training individual is designated to conduct the training activities instead of a general trainer. For example, the live expert sessions 110 may include a paid professional training instead of a workshop, which may be conducted by one of the customer's trainers. Presentations 112 may be direct presentations of how to use a software application. Offline products 114 include any available products for later training directly by the user, such as a training CD, a "how-to" book or any other resource.

The training methods 102 include ramp-up knowledge transfer 116, education method 118, university method 120, academy method 122 and sales training method 124. Knowledge transfer includes the transition of knowledge with communication forms as channels between a sender and a receiver by knowledge transfer methods and a knowledge transfer method may be an organizational unit which uses and designs compositions of communication forms.

The ramp-up knowledge transfer (RKT) method 116 includes the development of base knowledge features, including initial training of a user on the operation of a software application. The RKT method 116 uses a holistic knowledge transfer approach by establishing an integrative value creation link through the components of learning, doing and supporting. The learning element is a core component concerned with transmitting functional knowledge about new technologies with listing usable and doable supporting knowledge, such as guides, documentation, and other resources for experienced target groups. The second component is the doing element, focusing on transmitting task-related product implementation and usage knowledge. The doing element also offers a standardized collaboration to any other user support system. The supporting is directed to early ramp-up projects and offers project-related knowledge transfer to project members.

The education training method 118 includes the distribution of available resources for individual user training. The university training method 120 utilizes a general university setting to provide in-depth training for users. The academy training method 122 utilizes specific on-site training for users at the customer's training facilities, wherein the university training method 120 includes training at a third-party location. Sales training 124 includes training by sales professional used for the marketing and direct implementation of the software application.

Illustrated in FIG. 2, there exists various relationships between the communication forms and the learning methods. In the exemplary embodiment of forms 100 and training methods 102 of FIG. 2, there are 15 different relationships between communication forms 100 and learning methods 102, referred to below as situations. For example, the ramp-up knowledge transfer method 116 uses three different possible communication forms, learning maps 104, workshops 106 and live expert sessions 110. The education learning method 118 uses four possible communication forms, learning maps 104, workshops 106, live expert sessions 110 and offline products 114. The university learning method 120 uses three possible communication forms, learning maps 104, workshops 106 and live expert sessions 110. The academy learning method 122 uses three possible communication forms, learning maps 104, workshops 106 and live expert sessions 110. The sales training method uses three possible communication forms, workshops 106, sales essentials 108 and presentations 112.

Figure 3:
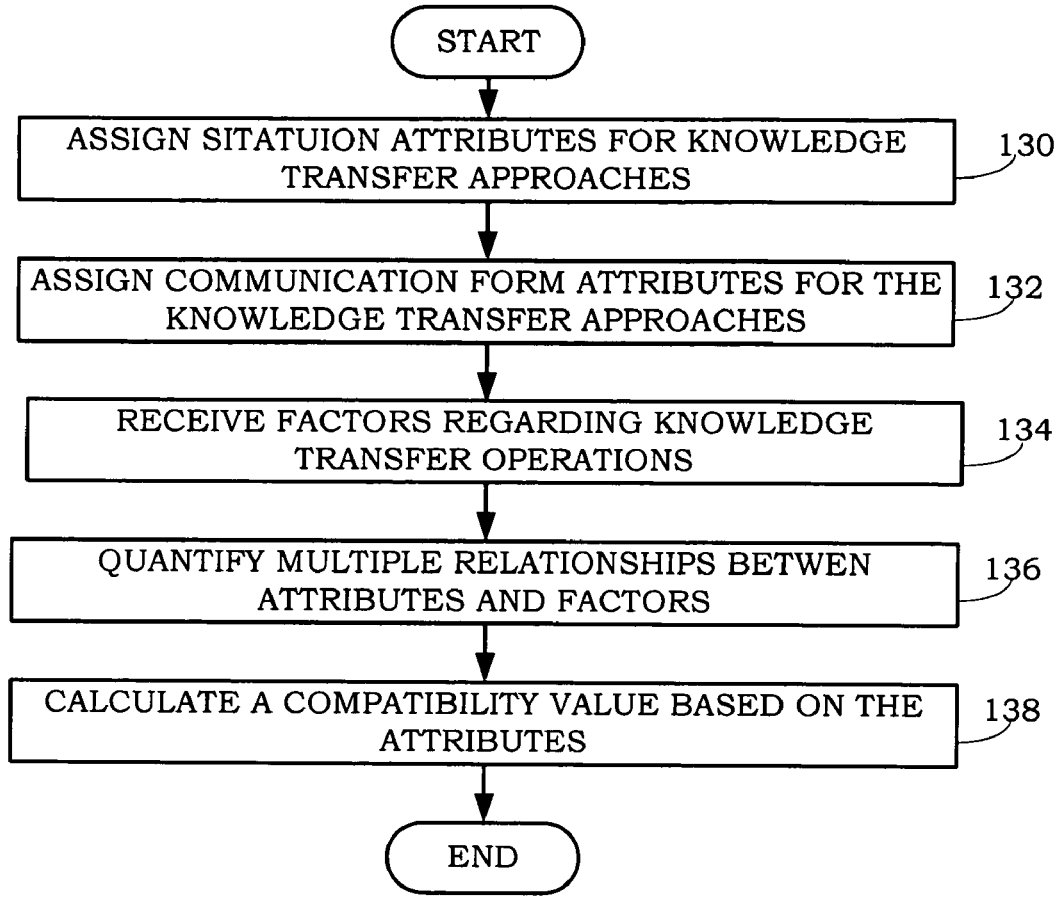
FIG. 3 illustrates a flowchart of the steps of one embodiment of a method for evaluating a knowledge transfer method.

FIG. 3 illustrates a flowchart of steps of one embodiment of a method for assessing a knowledge transfer approach. The knowledge transfer approach corresponds with a training situation including a particular training method (102 of FIG. 2) using a particular communication form (100 of FIG. 2). For example, a training situation may include a training academy method (122 of FIG. 2) using the workshop (106 of FIG. 2) learning methods 102 of FIG. 1.

Figure 4:
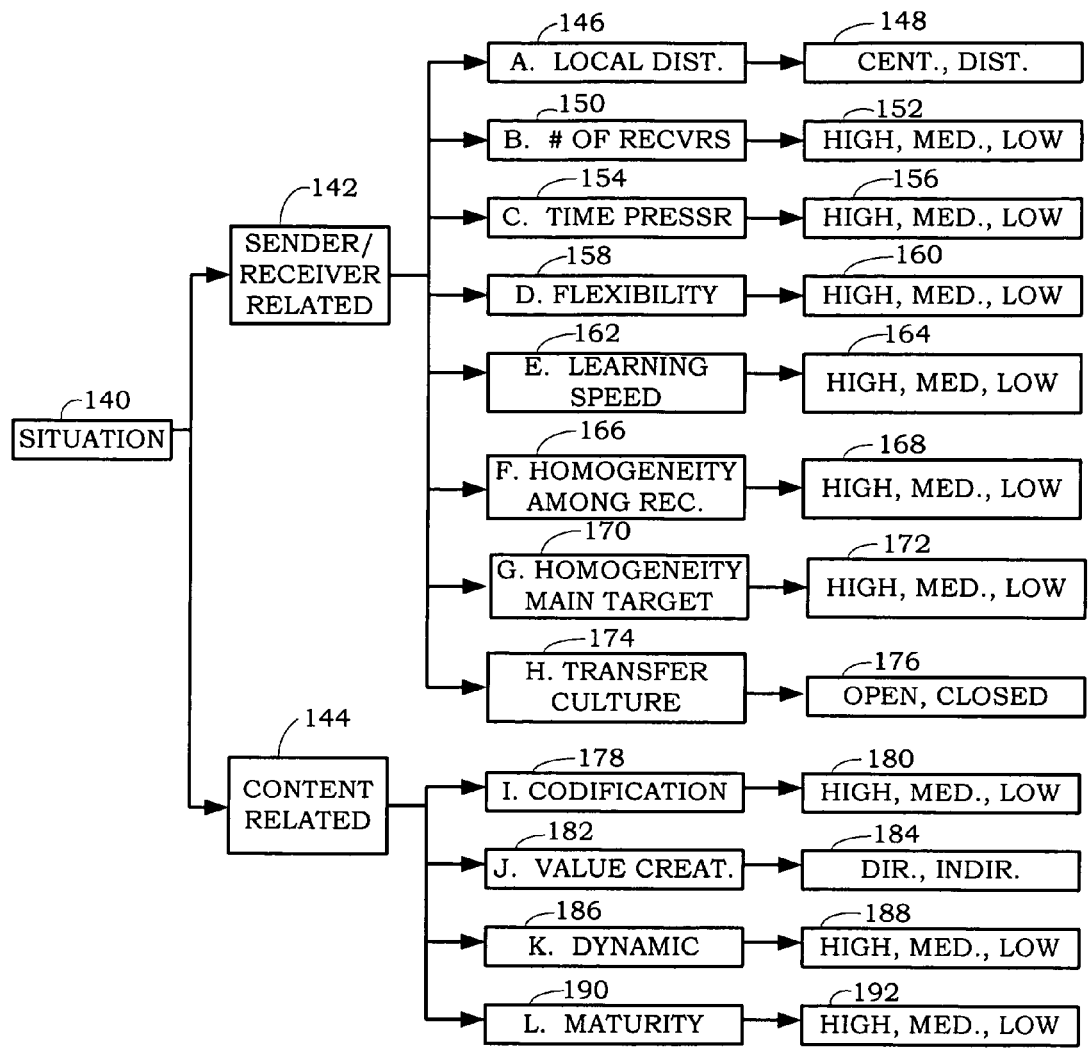
FIG. 4 illustrates a block diagram of one embodiment of situation attributes for different learning situations.

The first step, step 130, is to assign situation attributes for knowledge transfer approaches (e.g. the training method 102 with a communication form 100 of FIG. 1). One embodiment of this step is illustrated in FIG. 4. For a particular situation 140, the situation 140 is broken down to sender/receiver related attributes 142 and content related attributes 144. From these collective attributes 140 and 142, twelve situation attributes are designated for the knowledge transfer situation 140. The twelve situation attributes of FIG. 4 are for exemplary purposes only and any suitable number of attributes may be designated, as recognized by one having ordinary skill in the art.

For each attribute, a corresponding attribute value is determined. For the exemplary attributes of FIG. 4, the sender/receiver related attributes 142 include a local distribution of senders and receivers attribute 146, with a value choice 148 of either being centralized distribution or a distributed distribution. The second attribute 150 is the number of receivers of the knowledge transfer, with a value choice 152 of high, medium or low. The third attribute 154 is the time pressure for the knowledge transfer, with a value choice 156 of high, medium or low. The fourth attribute 158 is flexibility of the needs of the receivers, with a value choice 160 of high, medium or low. The fifth attribute 162 is the degree of homogeneity of the learning speed among the receivers, with a value choice 164 of high, medium or low.

The sixth attribute 166 is the degree of homogeneity of pre-knowledge among the receivers, with a value choice 168 of high, medium or low. The seventh attribute 170 is the degree of homogeneity of pre-knowledge in main target groups with a value choice 172 of high, medium or low. The eighth attribute 174 is the transfer culture, with a value choice 176 of open or closed. The ninth attribute 178 is the codification of knowledge with a value choice 180 of high, medium or low. The tenth attribute 182 is the value creation link of knowledge with a value choice 184 of direct or indirect. The eleventh attribute 186 is the dynamics of the knowledge being transferred with a value choice 188 of high, medium or low. The twelfth attribute 190 is the maturity of knowledge being transferred with a value choice 192 of high, medium or low.

Figure 5:
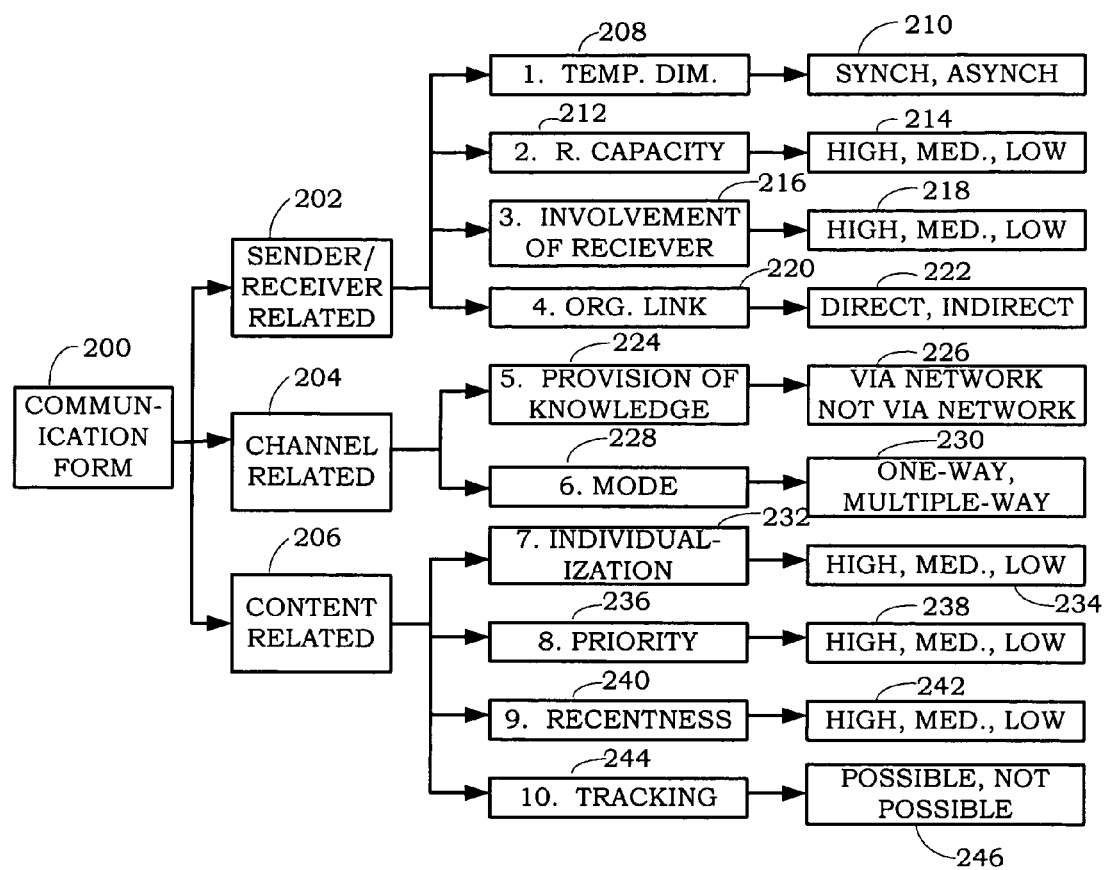
FIG. 5 illustrates a block diagram of one embodiment of situation attributes for different communication forms.

Referring back to FIG. 3, the next step, 132, is assigning a plurality communication form attributes for the knowledge transfer approach. For the different communication forms, such as the forms listed in FIG. 2, form attributes may be assigned. For example, FIG. 5 illustrates an exemplary embodiment of multiple form attributes for a particular communication form 200. The form 200 may be divided into three categories, sender/receiver related 202, channel related 204 and content related 206. From these three categories, ten communication form attributes may be determined in this exemplary embodiment, with each attribute having a value choice.

A first attribute 208 is the temporal dimension of the communication form 200, with a value choice 210 of synchronous or asynchronous. The second attribute 212 is the capacity of the receiver, with a value choice 214 of high, medium or low. The third attribute 216 is the involvement of the receiver in the knowledge selection, with a value choice 218 of high, medium or low. The fourth attribute 220 is the organizational link of the sender, with a value choice 222 of direct value creating or indirect value creating. The fifth attribute 224 is the provision of knowledge distribution with a value choice 226 of the knowledge being communicated via a network or not using a network. The sixth attribute 228 is the mode of communication with a value choice 230 of one-way communication or multiple-way communication. The seventh attribute 232 is the individualization of knowledge for each user with a value choice 234 of high, medium or low. The eighth attribute 236 is the prioritization of knowledge with a value choice 238 of high, medium or low. The ninth attribute 240 is the recentness of knowledge with a value choice 242 of high, medium or low. The tenth attribute 244 is the tracking of learning progress with a value choice 246 of possible or not possible.

Referring back to the method of FIG. 3, the next step, step 134, is to receive a plurality of factors regarding knowledge transfer operations. In one embodiment, this step may be performed by acquiring information from a customer. One approach includes a form questionnaire the customer completes and the answers to the questions may be used to derive the relationships between the situation attributes and the communication form attributes.

In one embodiment, the questionnaire may include the following questions: 1. Name of interviewee?; 2. Function of interviewee?; 3. Description of relevant situations? 4. Description of knowledge transfer method?; 5. How are senders and receivers locally distributed before a knowledge transfer will be conducted?; 6. How much senders are involved in knowledge transfer?; 7. How much receivers are involved in knowledge transfer?; 8. What time span can a receivers accept from the point of transfer necessity to conduction of transfer?; 9. How strong do receivers demand flexible transfer times?; 10. How strong differ receivers in speed of adapting and processing knowledge?; 11. How strong differ receiver's pre-knowledge regarding the knowledge object?; 12. How strong can knowledge be codified?; 13. Is knowledge used in primary or secondary value chain activities?; 14. How fast changes knowledge?; and any other suitable question are recognized by one having ordinary skill in the art.

The next step, step 136, is to quantify multiple relationships between the attributes and the factors. This step may be performed using the guidelines to define the compatibility for the knowledge transfer operations. In one embodiment, this step may be performed using a relationship matrix to associate the responses with the attributes of the knowledge transfer operation, including the communication form of the knowledge transfer operation and the training method of the knowledge transfer operation. The next step, step 138 is to calculate a compatibility value based on the attributes. This step may also be performed using the relationship matrix.

FIG. 6 illustrates an exemplary embodiment of a relationship matrix 250 for determining the compatibility value. The relationship matrix 250 includes the situation form attributes 104 of FIG. 4 and the communication form attributes 200 of FIG. 5. Based on a direct comparison of the attributes, if the attributes are compatible, an "X" is placed in the corresponding grid box. For example, in the exemplary matrix of FIG. 6, the situation attribute 146 of being locally distributed is compatible with the temporal dimension 208 of the corresponding communication form attribute.

In generating the matrix 250, rules are established to define the compatibility of the communication form attributes and the situation attributes. As illustrated in FIG. 2, for the learning methods, there are sixteen different possible communication forms. If each communication form were to have ten attributes, there would be approximately 160 total rules governing each communication form attribute for each possible learning method using an available communication form.

For example, rules governing the ramp-up knowledge transfer learning method using a learning map communication being form may define compatibility with (1) the temporal dimension being asynchronous, (2) the receiver capacity being high, (3) the involvement of receiver in knowledge selection being high, (4) the organizational link of sender direct, (5) the provision of knowledge being via networks, (6) the mode of communication being one-way, (7) the individualization of knowledge being medium, (8) the prioritization of knowledge being medium, (9) the recentness of knowledge being high and (10) the tracking of learning progress being possible.

For example, rules governing the ramp-up knowledge transfer learning method using a workshop communication being form may define compatibility with (1) the temporal dimension being synchronous, (2) the receiver capacity being low, (3) the involvement of receiver in knowledge selection being high, (4) the organizational link of sender direct, (5) the provision of knowledge being not via networks, (6) the mode of communication being multiple way, (7) the individualization of knowledge being medium, (8) the prioritization of knowledge being low, (9) the recentness of knowledge being medium and (10) the tracking of learning progress being not possible.

For example, rules governing the ramp-up knowledge transfer learning method using a live expert session communication being form may define compatibility with (1) the temporal dimension being synchronous, (2) the receiver capacity being low, (3) the involvement of receiver in knowledge selection being high, (4) the organizational link of sender direct, (5) the provision of knowledge being via networks, (6) the mode of communication being multiple way, (7) the individualization of knowledge being medium, (8) the prioritization of knowledge being high, (9) the recentness of knowledge being high and (10) the tracking of learning progress being not possible.

For example, rules governing the education learning method using a learning map communication being form may define compatibility with (1) the temporal dimension being asynchronous, (2) the receiver capacity being high, (3) the involvement of receiver in knowledge selection being medium, (4) the organizational link of sender being direct, (5) the provision of knowledge being via networks, (6) the mode of communication being one way, (7) the individualization of knowledge being medium, (8) the prioritization of knowledge being medium, (9) the recentness of knowledge being low and (10) the tracking of learning progress being possible.

For example, rules governing the education learning method using a workshop communication being form may define compatibility with (1) the temporal dimension being synchronous, (2) the receiver capacity being low, (3) the involvement of receiver in knowledge selection being medium, (4) the organizational link of sender being direct, (5) the provision of knowledge being not via networks, (6) the mode of communication being multiple way, (7) the individualization of knowledge being medium, (8) the prioritization of knowledge being low, (9) the recentness of knowledge being medium and (10) the tracking of learning progress being possible.

For example, rules governing the education learning method using a live expert session communication being form may define compatibility with (1) the temporal dimension being synchronous, (2) the receiver capacity being low, (3) the involvement of receiver in knowledge selection being medium, (4) the organizational link of sender being direct, (5) the provision of knowledge being via networks, (6) the mode of communication being multiple way, (7) the individualization of knowledge being medium, (8) the prioritization of knowledge being low, (9) the recentness of knowledge being low and (10) the tracking of learning progress being possible.

For example, rules governing the education learning method using an offline products communication being form may define compatibility with (1) the temporal dimension being synchronous, (2) the receiver capacity being high, (3) the involvement of receiver in knowledge selection being medium, (4) the organizational link of sender being direct, (5) the provision of knowledge being not via networks, (6) the mode of communication being one way, (7) the individualization of knowledge being low, (8) the prioritization of knowledge being low, (9) the recentness of knowledge being low and (10) the tracking of learning progress being not possible.

For example, rules governing the University learning method using a learning map communication form may define compatibility with (1) the temporal dimension being asynchronous (2) the receiver capacity being high, (3) the involvement of receiver in knowledge selection being medium, (4) the organizational link of sender being indirect, (5) the provision of knowledge being via networks, (6) the mode of communication being one way, (7) the individualization of knowledge being medium, (8) the prioritization of knowledge being medium, (9) the recentness of knowledge being low and (10) the tracking of learning progress being possible.

For example, rules governing the University learning method using a workshop communication form may define compatibility with (1) the temporal dimension being synchronous (2) the receiver capacity being low, (3) the involvement of receiver in knowledge selection being medium, (4) the organizational link of sender being indirect, (5) the provision of knowledge being not via networks, (6) the mode of communication being multiple way, (7) the individualization of knowledge being medium, (8) the prioritization of knowledge being low, (9) the recentness of knowledge being low and (10) the tracking of learning progress being not possible.

For example, rules governing the University learning method using a live expert session communication form may define compatibility with (1) the temporal dimension being synchronous (2) the receiver capacity being low, (3) the involvement of receiver in knowledge selection being medium, (4) the organizational link of sender being indirect, (5) the provision of knowledge being via networks, (6) the mode of communication being multiple way, (7) the individualization of knowledge being medium, (8) the prioritization of knowledge being low, (9) the recentness of knowledge being low and (10) the tracking of learning progress being not possible.

For example, rules governing the support academy learning method using a learning map communication form may define compatibility with (1) the temporal dimension being asynchronous, (2) the receiver capacity being high, (3) the involvement of receiver in knowledge selection being low, (4) the organizational link of sender being direct, (5) the provision of knowledge being via networks, (6) the mode of communication being one way, (7) the individualization of knowledge being medium, (8) the prioritization of knowledge being medium, (9) the recentness of knowledge being low and (10) the tracking of learning progress being possible.

For example, rules governing the support academy learning method using a workshop communication form may define compatibility with (1) the temporal dimension being synchronous, (2) the receiver capacity being low, (3) the involvement of receiver in knowledge selection being medium, (4) the organizational link of sender being direct, (5) the provision of knowledge being not via networks, (6) the mode of communication being multiple way, (7) the individualization of knowledge being medium, (8) the prioritization of knowledge being low, (9) the recentness of knowledge being medium and (10) the tracking of learning progress being not possible.

For example, rules governing the support academy learning method using a live expert session communication form may define compatibility with (1) the temporal dimension being synchronous, (2) the receiver capacity being low, (3) the involvement of receiver in knowledge selection being high, (4) the organizational link of sender being direct, (5) the provision of knowledge being via networks, (6) the mode of communication being multiple way, (7) the individualization of knowledge being medium, (8) the prioritization of knowledge being low, (9) the recentness of knowledge being medium and (10) the tracking of learning progress being not possible.

For example, rules governing the sales training learning method using a sales essential communication form may define compatibility with (1) the temporal dimension being asynchronous, (2) the receiver capacity being high, (3) the involvement of receiver in knowledge selection being high, (4) the organizational link of sender being direct, (5) the provision of knowledge being via networks, (6) the mode of communication being one way, (7) the individualization of knowledge being low, (8) the prioritization of knowledge being low, (9) the recentness of knowledge being medium and (10) the tracking of learning progress being not possible.

For example, rules governing the sales training learning method using a workshop communication form may define compatibility with (1) the temporal dimension being synchronous, (2) the receiver capacity being low, (3) the involvement of receiver in knowledge selection being low, (4) the organizational link of sender being direct, (5) the provision of knowledge being not via networks, (6) the mode of communication being multiple way, (7) the individualization of knowledge being medium, (8) the prioritization of knowledge being low, (9) the recentness of knowledge being low and (10) the tracking of learning progress being not possible.

For example, rules governing the sales training learning method using a presentation communication form may define compatibility with (1) the temporal dimension being synchronous, (2) the receiver capacity being medium, (3) the involvement of receiver in knowledge selection being low, (4) the organizational link of sender being direct, (5) the provision of knowledge being via networks, (6) the mode of communication being one way, (7) the individualization of knowledge being low, (8) the prioritization of knowledge being low, (9) the recentness of knowledge being medium and (10) the tracking of learning progress being not possible.

Further rules may be defined regarding specific attribute levels. For example, in one embodiment, a receiver capacity may be deemed high if there are more than a set number of receivers, a medium level if the capacity is between the set number of receivers and a bottom threshold number and low if below the bottom threshold. For example, if more than 400 receivers, a capacity level can be deemed high, below 100 the capacity level deemed low and between 100 and 400 receivers, the capacity level deemed medium. The attribute of the involvement of the receiver in the knowledge selection being may be deemed high if a direct preference survey is given, medium is an indirect preference survey is given and low is no survey is given. The individualization of the knowledge may be deemed high if it is per individual, medium if individualized per a group and low if there is no individualization. The recentness of knowledge may be based on the number of updates to the software within a given period, such as the number of updates in a given year.

With reference back to the step 136 of FIG. 3, the compatibility value is determined based on the populated relationship matrix 250 of FIG. 6. In one embodiment, an assessment value component having a value of 1 is given for every "X" in the matrix, where the assessment value component is an arbitrary value given to matched elements of the relationship matrix to thereby be further processed. The total number of "Xs" is determined and this number is then converted to a percentage value. In the embodiment of FIG. 6, there are 120 possible compatibility options, the number of "Xs" corresponds directly to the percentage value. In the relationship matrix of FIG. 6, the compatibility value is 45 percent based on the 54 compatibility relationships, out of 120, between the situation form attributes 140 and the communication format attributes 200.

Therefore, in the flowchart of FIG. 3, the method for assessing a knowledge transfer approach is complete. The assessment includes determining the compatibility value. Based on this compatibility value, the customer may quickly and efficiently determine if the learning method using the communication form is the optimized approach for knowledge transfer.

Figure 7:
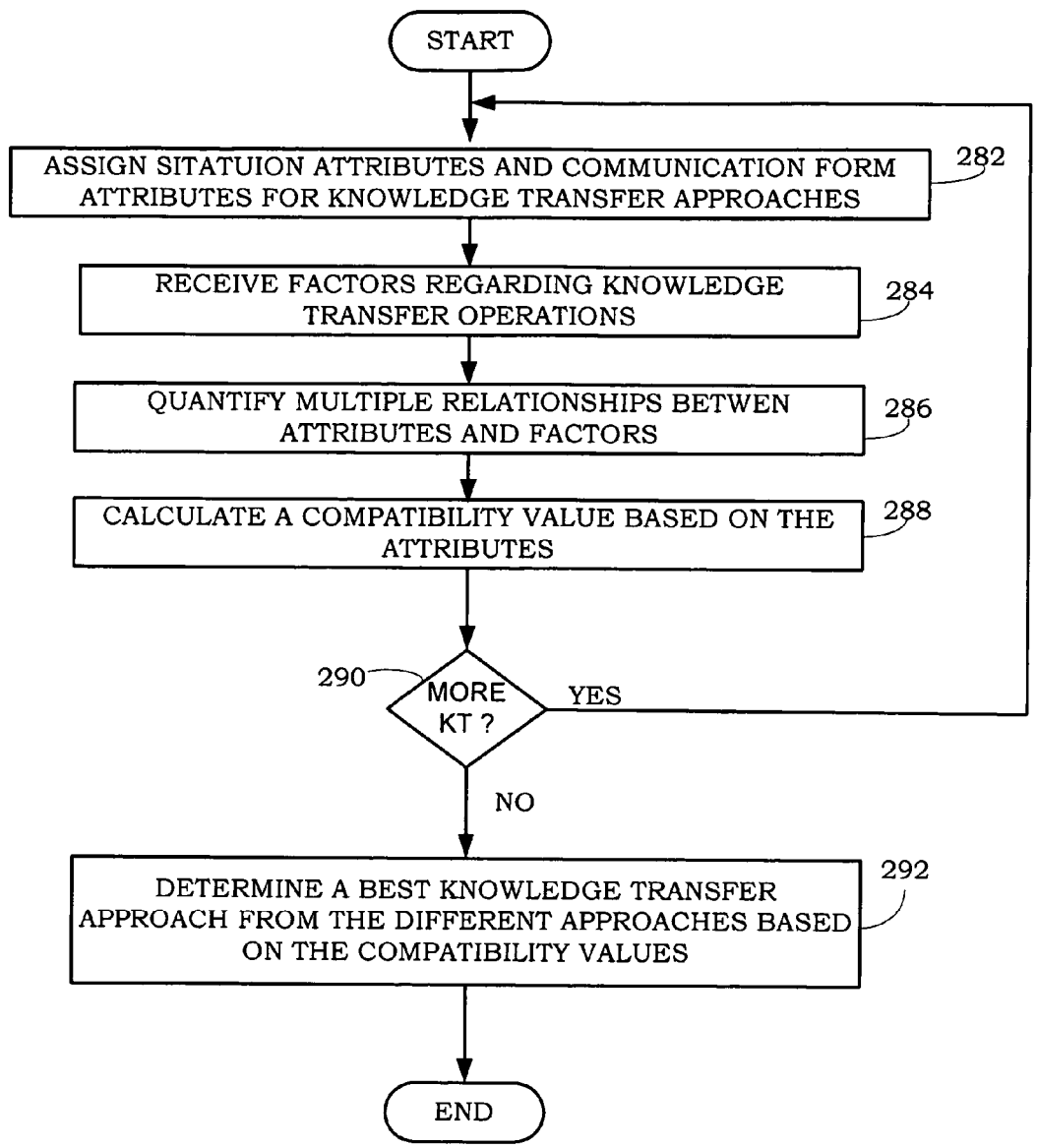
FIG. 7 illustrates a flowchart of the steps of one embodiment of a method for evaluating multiple knowledge transfer approaches.

FIG. 7 illustrates the steps of a method for evaluating a knowledge transfer approach based on a comparison with other knowledge transfer approaches. This method is performed using a processing device, such as the processor 72 of FIG. 1, in response to executable instructions. The method begins, step 282, by assigning situation attributes for a knowledge transfer approach and assigning communication form attributes for the knowledge transfer approach. The next step, step 284 receiving a plurality of factors regarding the knowledge transfer operations, wherein the responses include multiple factors associates with the customer's operations.

Step 286 is quantifying multiple relationships between attributes, such as using a relationship matrix. Thereupon, step 288 is calculating a compatibility value for the knowledge transfer approach based on the attributes. Steps 282 through 288 are similar to the steps of the method discussed above with respect to FIGS. 3-6. Although, steps 282 through 288 are performed once for each knowledge transfer approach. For example, if the learning method is a university method, there may be three possible communication forms, learning maps 104, workshops 106 and live expert sessions 110 of FIG. 2.

As such, the next step of the method of FIG. 7 is to determine if there are any more knowledge transfer methods to be evaluated, step 290. If the answer is yes, the method proceeds back to step 282 where the steps 282 through 288 are repeated, generating another compatibility value. When all the compatibility values for the different knowledge transfer approaches are calculated, the method proceeds to step 290, determining a best knowledge transfer approach from the different approaches based on the compatibility values. Therefore, a particular knowledge transfer approach may be directly evaluated with other possible knowledge transfer approach to give a customer an assessment of different knowledge transfer approaches in comparison to each other. As such, in this embodiment, the method is complete.

In one embodiment, the knowledge transfer approach may be improved based on the compatibility value. Using the relationship matrix, incompatible aspects to different knowledge transfer approaches can be easily recognized. Therefore, based on the relationship matrix, a customized knowledge transfer method may be designed incorporating the benefits of the general learning method but also including knowledge transfer steps based on previous-noted incompatibilities.

As such, through the generation of a compatibility value, a customer may quickly and accurately determine the effectiveness of a training approach. Through the individual customer assessment, the compatibility value provides a general assessment for the customer's specific training situation. By having the knowledge of the best knowledge transfer approach prior to the implementation of a training program, a customer can most effectively implement the new technology and quickly disseminate the knowledge transfer required for effective utilization of the software.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. For example, the rules defining the relationships between the attributes may be any suitable rules configured relative to knowledge transfer techniques and the number of situation attributes and communication form attributes may be any suitable number to allow for the generation of the compatibility value. It is therefore contemplated to cover any and all modifications, variations or equivalents that fall within the scope of the basic underlying principals disclosed and claimed herein.

What is claimed is:

1. An automated knowledge transfer approach selection method comprising:
    via an electronic interface, querying a customer to receive a plurality of responses regarding knowledge transfer operations, the responses within a plurality of pre-defined guidelines;
    associating the customer responses with a plurality communication form attributes and a plurality of situation attributes;
    comparing each response against a stored knowledge transfer matrix, the knowledge transfer matrix storing definitions of available communication forms and available training methods, wherein the communication form definitions include an identification of the communication form attributes associated with a communication form and the situation attributes associated with a training method;
    quantifying matches between the responses and the communication form attributes and the situation attributes of the knowledge transfer matrix;
    generating a compatibility value for a knowledge transfer approach based on the quantified matches; and
    selecting one of the plurality of knowledge transfer approaches for training the customer based on the compatibility values.

2. The method of claim 1 further comprising:
    generating the knowledge transfer matrix based on communication form attributes and situation attributes associated with the knowledge transfer approach.

3. The method of claim 1 further comprising:
    generating a plurality of compatibility values for each of a plurality of knowledge transfer approaches.

4. A method for assessing a knowledge transfer approach, the method comprising:
    assigning a plurality of situation attributes and a plurality of communication form attributes for the knowledge transfer approach;
    receiving a plurality of factors regarding knowledge transfer operations;
    quantifying a plurality of relationships between the situation attributes, the communication form attributes and the plurality of factors of a knowledge transfer matrix, the knowledge transfer matrix storing definitions of available communication forms and available training methods, wherein the communication form definitions include an identification of the communication form attributes associated with a communication form and the situation attributes associated with a training method;
    calculating a compatibility value between the situation attributes and the communication form attributes based on the quantifying;
    assessing the knowledge transfer approach based on the compatibility value; and
    providing a customer the compatibility value component, wherein the compatibility value component is the compatibility for the knowledge transfer approach to use the communication form for the situation and for the factors.

5. The method of claim 4 further comprising:
    generating a plurality of compatibility value components based on the relationship between the situation attributes and the communication form attributes.

6. The method of claim 5 further comprising:
    calculating the compatibility value based on the sum of compatibility value components.

7. The method of claim 4 wherein the step of quantifying a plurality of relationships between the situation attributes, the communication form attributes and the plurality of factors further comprises:
    receiving a plurality of responses from the customer, the responses having a plurality of factors disposed therein;
    associating each of the plurality of responses with the situation attributes and the communication form attributes; and
    assigning an assessment value component to each of the plurality of responses answers.

8. The method of claim 7 further comprising:
    generating a relationship matrix including the plurality of situation attributes and the plurality of communication form attributes; and integrating the compatibility values to the relationship matrix.

9. The method of claim 4 further comprising: comparing the knowledge transfer approach with another knowledge transfer approaches based on compatibility values.

10. A method for evaluating a knowledge transfer situation, the method comprising:
for each of a plurality of knowledge transfer approaches:
assigning a plurality of situation attributes and a plurality of communication form attributes;
receiving a plurality of factors regarding knowledge transfer operations;
quantifying a plurality of relationships between the situation attributes, the communication form attributes and the plurality of factors of a knowledge transfer matrix, the knowledge transfer matrix storing definitions of available communication forms and available training methods, wherein the communication form definitions include an identification of the communication form attributes associated with a communication form and the situation attributes associated with a training method;
calculating a compatibility value between the situation attributes and the communication form attributes based on the quantifying;
assessing the knowledge transfer approach based on the compatibility value;
determining a best knowledge transfer approach from the plurality of knowledge transfer approaches based on the compatibility values of each of the knowledge transfer approaches; and
providing to a customer the best knowledge transfer approach.

11. The method of claim 10 further comprising:
for each of the plurality of knowledge transfer approaches, generating a plurality of compatibility value components based on the relationship between the situation attributes and the communication form attributes.

12. The method of claim 11 further comprising:
for each of the plurality of knowledge transfer approaches, calculating the compatibility value based on the sum of the compatibility value components.

13. The method of claim 10 wherein the step of deriving a plurality of relationships between the situation attributes and the communication form attributes further comprises:
receiving a plurality of responses from a customer, the responses having a plurality of factors disposed therein;
associating each of the plurality of responses with the situation attributes and the communication form attributes; and
assigning an assessment value component to each of the plurality of responses.

14. The method of claim 13 further comprising:
generating a relationship matrix including the plurality of situation attributes and the plurality of communication form attributes; and
integrating the compatibility values to the relationship matrix.

15. An apparatus for assessing a knowledge transfer approach, the apparatus comprising:
a memory storing executable instructions; and
a processor in operative communication with the memory, the processor operative to receive executable instructions and in response thereto:
assign a plurality of situation attributes and a plurality of communication form attributes for the knowledge transfer approach;
receive a plurality of factors regarding knowledge transfer operations;
quantify a plurality of relationships between the situation attributes, the communication form attributes and the plurality of factors of a knowledge transfer matrix, the knowledge transfer matrix storing definitions of available communication forms and available training methods, wherein the communication form definitions include an identification of the communication form attributes associated with a communication form and the situation attributes associated with a training method;
calculate a compatibility value between the situation attributes and the communication form attributes based on the quantifying;
assessing the knowledge transfer approach based on the compatibility value;
providing to a customer the assessment of the knowledge transfer approach.

16. The apparatus of claim 15 wherein the processor is further operative to, in response to executable instructions:
generate a plurality of compatibility value components based on the relationship between the situation attributes and the communication form attributes.

17. The apparatus of claim 16 wherein the processor is further operative to, in response to executable instructions:
calculate the compatibility value based on the sum of compatibility value components.

18. The apparatus of claim 15 wherein the processor is further operative to, in response to executable instructions:
receive a plurality of responses from a customer, the responses having a plurality of factors disposed therein;
associate each of the plurality of responses with the situation attributes and the communication form attributes; and
assign an assessment value component to each of the plurality of responses.

19. The apparatus of claim 18 wherein the processor is further operative to, in response to executable instructions:
generate a relationship matrix including the plurality of situation attributes and the plurality of communication form attributes; and
integrate the compatibility values to the relationship matrix.

* * * * *